United States Patent
Brownlee

(10) Patent No.: US 8,882,873 B2
(45) Date of Patent: Nov. 11, 2014

(54) VORTEX FINDER FOR CYCLONE SEPARATOR

(76) Inventor: David Brownlee, Franklin, TN (US)

( * ) Notice: Subject to any disclaimer, the term of this patent is extended or adjusted under 35 U.S.C. 154(b) by 357 days.

(21) Appl. No.: 13/370,365

(22) Filed: Feb. 10, 2012

(65) Prior Publication Data
US 2012/0204526 A1 Aug. 16, 2012

Related U.S. Application Data

(60) Provisional application No. 61/442,298, filed on Feb. 14, 2011.

(51) Int. Cl.
*B04C 5/13* (2006.01)
*F23C 10/18* (2006.01)
*F23C 10/10* (2006.01)

(52) U.S. Cl.
CPC . *B04C 5/13* (2013.01); *F23C 10/18* (2013.01); *F23C 10/10* (2013.01)
USPC .......................................... 55/459.1; 95/271

(58) Field of Classification Search
CPC ............ B04C 5/13; F23C 10/10; F23C 10/18
USPC ............... 95/271; 55/459.1, 455, 337; 138/44
See application file for complete search history.

(56) References Cited

U.S. PATENT DOCUMENTS

| | | | |
|---|---|---|---|
| 2,472,777 A | 6/1949 | Putney | |
| 2,967,618 A | 1/1961 | Vane | |
| 3,885,933 A | 5/1975 | Putney | |
| 3,901,799 A | 8/1975 | Adkison | |
| 4,151,083 A | 4/1979 | Dove | |
| 4,317,716 A | 3/1982 | Liller | |
| 4,651,783 A * | 3/1987 | Christiansen | .................. 138/107 |
| 4,702,181 A | 10/1987 | Brown | |
| 5,042,998 A | 8/1991 | Beusen | |
| 5,441,081 A | 8/1995 | Maury | |
| 6,739,456 B2 | 5/2004 | Svoronos et al. | |
| 6,811,713 B2 | 11/2004 | Arnaud | |
| 6,837,913 B2 | 1/2005 | Schilling et al. | |
| 7,434,694 B1 | 10/2008 | Elvin | |
| 7,594,941 B2 | 9/2009 | Zheng et al. | |

* cited by examiner

*Primary Examiner* — Duane Smith
*Assistant Examiner* — Britanny Precht
(74) *Attorney, Agent, or Firm* — Berenato & White, LLC

(57) ABSTRACT

A vortex finder for a cyclone separator, comprising a plurality of superposed rings each including a plurality of suspended plate segments. Each of the plate segments includes a main plate having radially offset upper and lower end portions, opposite inner and outer faces, an upper support member integrally formed with the upper end portion to protrude from the outer face, and a lower support member integrally formed with the lower end portion to protrude from the inner face. The upper support member of the plate segments of the one of the rings engages and is supported by the lower support member of the plate segments of another of the rings positioned above the one of the rings. The lower support member defines an open-bottom pocket having at least one pass-through opening for fluidly connecting a space inside the vortex finder with a space outside the vortex finder.

22 Claims, 9 Drawing Sheets

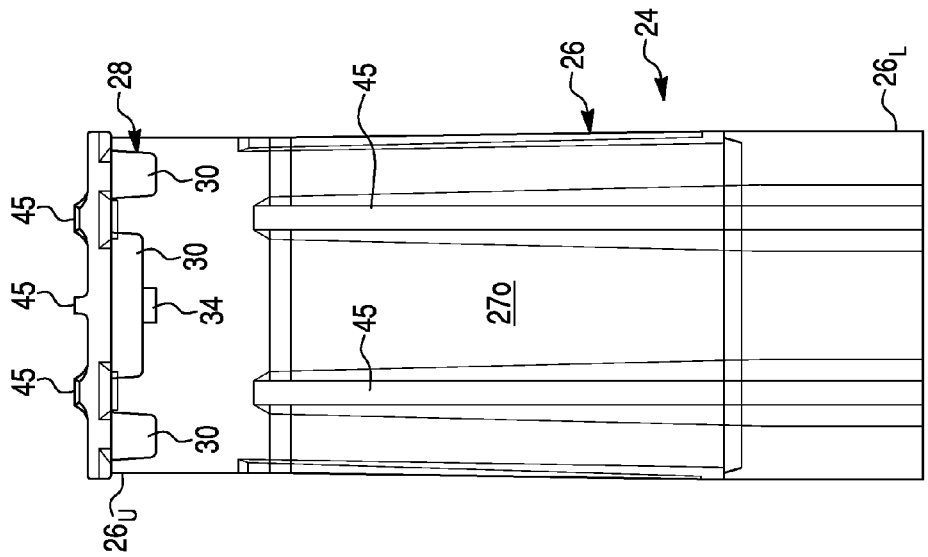
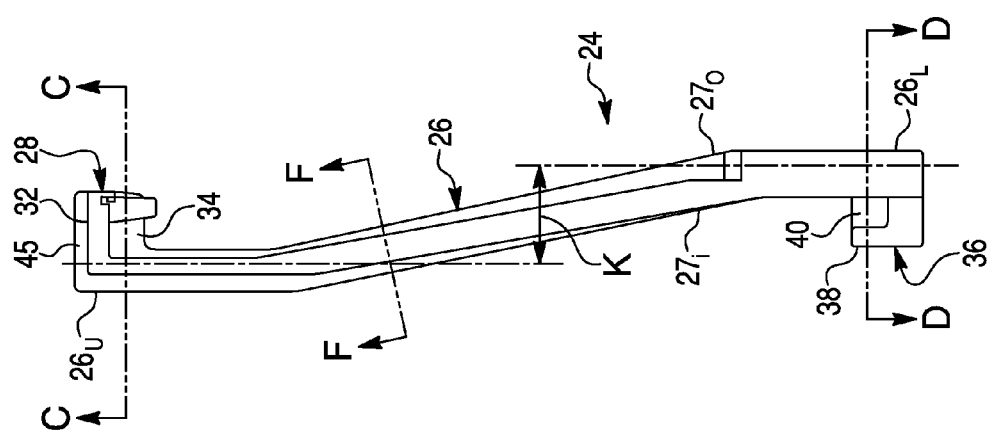
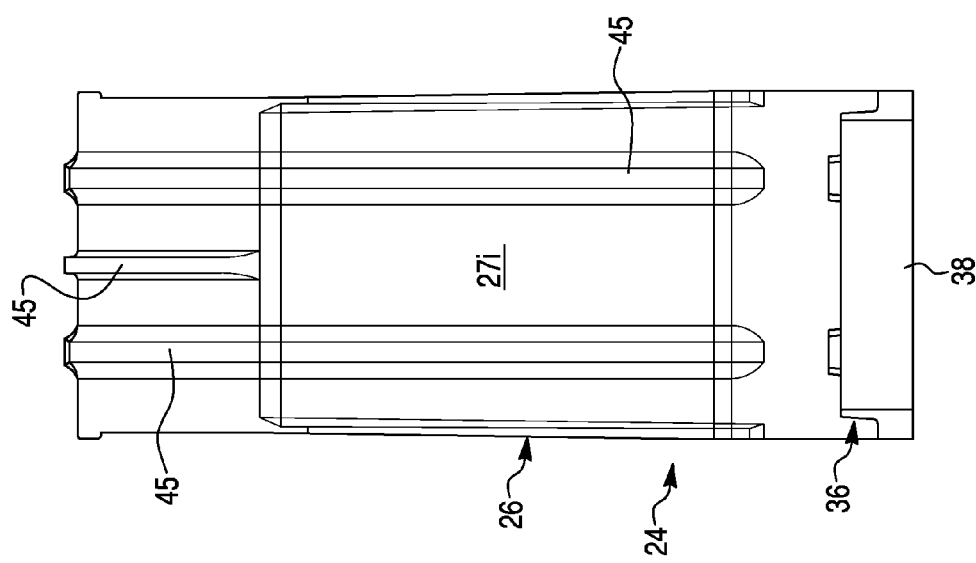

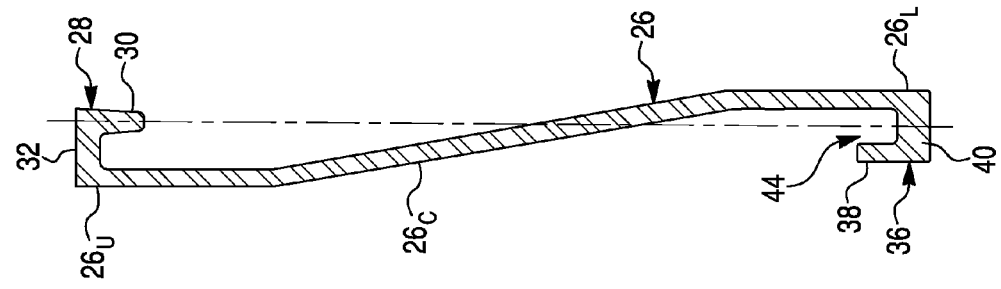
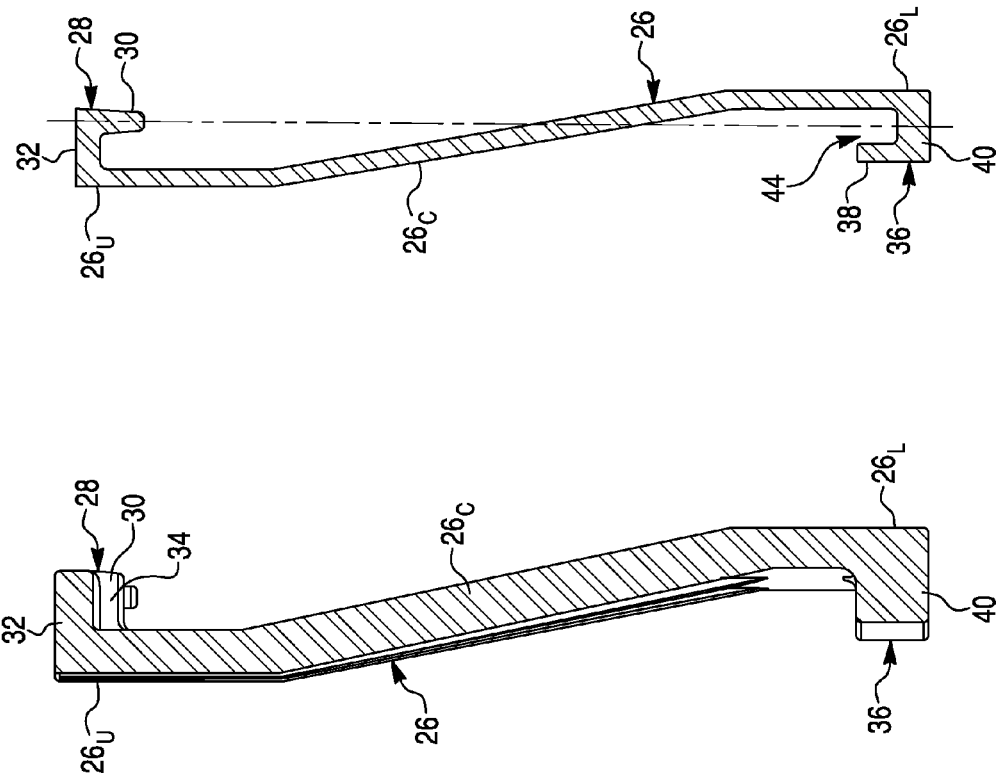
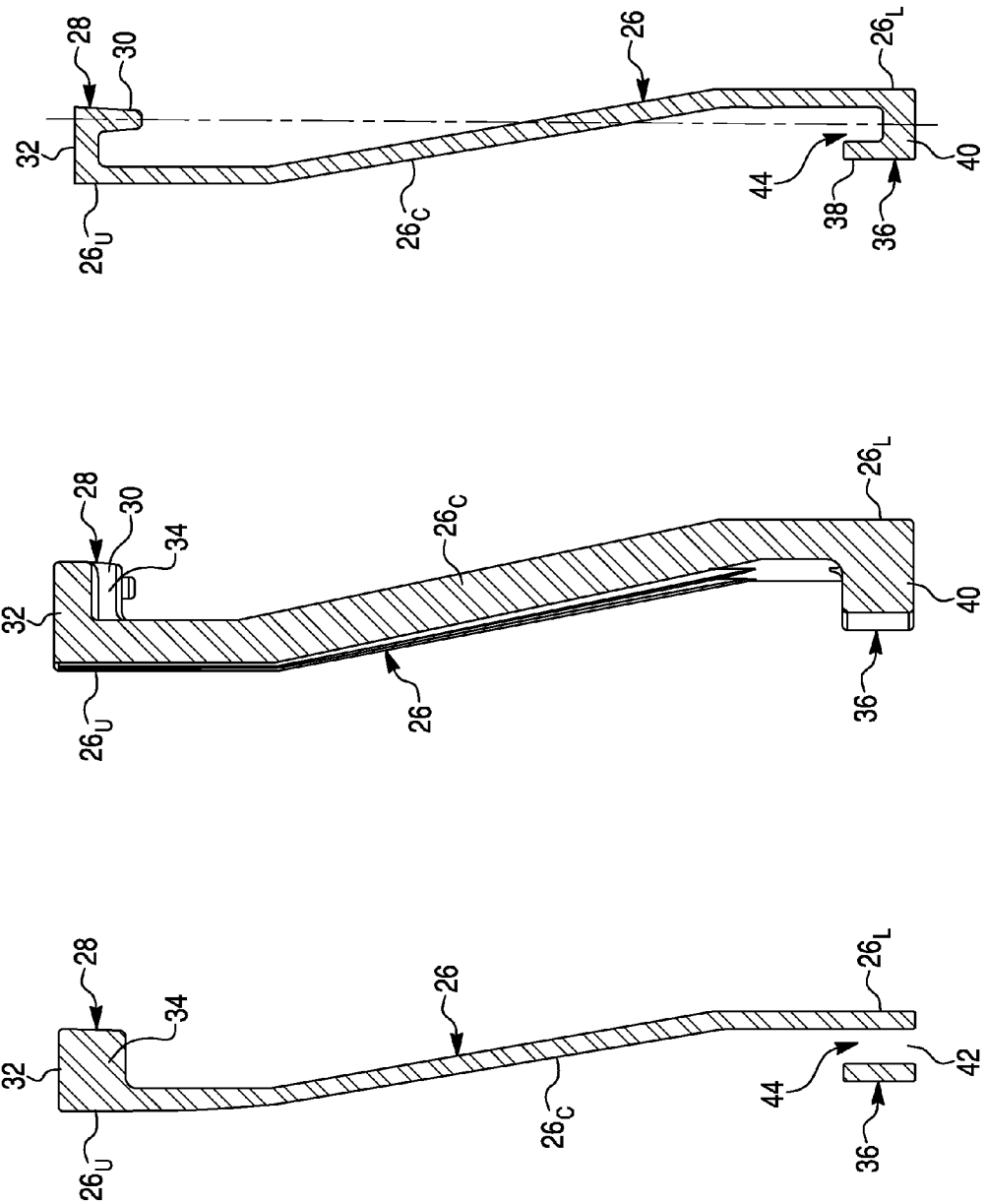

VORTEX FINDER FOR CYCLONE SEPARATOR

CROSS-REFERENCE TO RELATED APPLICATION

This Application claims the benefit under 35 U.S.C. 119(e) of U.S. Provisional Application No. 61/442,298 filed Feb. 14, 2011 by David A. Brownlee, which is hereby incorporated herein by reference in its entirety and to which priority is claimed.

BACKGROUND OF THE INVENTION

1. Field of the Invention

The present invention relates to cyclone separators provided to separate solid particles from a gas stream, and, more particularly, to a segmented vortex finder for cyclone separators such as used with circulating fluidized bed combustors and reactors.

2. Description of the Related Art

Cyclone separators connected to an outlet of pressurized fluidized bed combustors (PFBC), atmospheric fluidized bed combustors (AFBC) or circulating fluidized bed combustors (CFBC) are generally known. A cyclone separator is a device for removing particulates from an air, gas or liquid stream, without the use of filters, through vortex separation. Rotational effects and gravity are used to separate mixtures of solids and fluids. The cyclone separator can also be used to separate fine droplets of liquid from a gaseous stream. Cyclone separators are used in the cement, aluminum, and power industries.

A high speed rotating airflow is established within a cylindrical or conical container of the cyclone separator. Air flows in a helical pattern, beginning at the top (wide end) of the cyclone and ending at the bottom (narrow) end before exiting the cyclone in a straight stream through the center of the cyclone, up through a vortex finder and out the top. Larger (denser particles in the rotating stream have too much inertia to follow the tight curve of the stream, and strike the outside wall, then falling to the bottom of the cyclone where they can be removed. In a conical system, as the rotating flow moves towards the narrow end of the cyclone, the rotational radius of the stream is reduced, thus separating smaller and smaller particles. The cyclone geometry, together with flow rate, defines a cut point of the cyclone separator. This is the size of particle that will be removed from the stream with 50% efficiency. Particles larger than the cut point will be removed with a greater efficiency and smaller particles with a lower efficiency.

In other words, cyclone separators use cyclonic action to separate dust particles from the gas stream. In a typical cyclone separator, the dust gas stream enters at an angle and is spun rapidly. The centrifugal force created by the circular flow throws the dust particles toward the wall of the cyclone separator. After striking the wall, these particles fall into a hopper located underneath. The cyclone separator creates a dual vortex to separate coarse dust particles from fine dust particles. A main downward vortex spirals downward and carries most of the coarser dust particles. An inner ascending vortex spirals upward and carries finer dust particles.

Vortex finders (also known as dip tubes, dip legs, immersion tubes, etc.) are a common component of cyclone separators. The cyclone separator creates a dual vortex to separate coarse dust particles from fine dust particles. A main downward vortex spirals downward and carries most of the coarser dust particles. An inner ascending vortex spirals upward and carries finer dust particles exiting the cyclone separator through a vortex finder. Vortex finders in cyclone separators have a tubular shape and serve to remove the tighter volatile components (finer dust particles, such as ash) along an axis of the cyclone separator in an upward direction without impeding the upward flow by the tangentially incoming medium.

Presently, a vortex finder is in the form of a welded or segmented plate, and/or segmented interlocking pieces of metal or ceramic. Also known in the art are vortex finders, which comprise hanging segments where one segment hangs on the upper segment in a staggered manner; i.e. the center line of the lower plate is in line with the sides of the supporting segment. Currently, pockets, which support the tower segments, have a solid bottom allowing particles, such as ash, to accumulate.

Current vortex finders suffer from thermal cycling, temperature over runs, and ash build up on the segments and in the pockets of the segments. When the pockets get full of ash the segments cannot expand and contract as originally designed. This hindered expansion/contraction induce stresses in the segments and in the wedges. These stresses, over time, cause the components to warp and ultimately, to be replaced.

The reduction of maintenance and increased performance of fluidized bed combustion (FBC) boilers presents the need for an improved design of vortex finders. The need therefore exists for a vortex finder for a cyclone separator, which is suitable for adaptation to differently sized cyclones designs, and in which individual components can be easily replaced. The need also exists for a vortex finder that comprises plate segments, which reduce the possibility of deformation or braking, are stronger yet have lower weight, and provide reduced stresses at peak stress points and reduced heat loss.

SUMMARY OF THE INVENTION

A first aspect of the invention provides a vortex finder for a cyclone separator, suspended from a top end of the cyclone separator. The vortex finder comprises a central axis and a plurality of superposed, circumferentially extending rings coaxial to the central axis and assembled so as to form the vortex finder. Each of the rings comprising of a plurality of substantially identical plate segments positioned at the same level so as to form the ring. The plate segments of one of the rings are suspended under the force of gravity from the plate segments of the adjacent ring positioned above the one of the rings for connecting the plate segments of each the ring to one another. Each of the plate segments includes a non-flat main plate having an upper end portion and a lower end portion radially offset from the upper end portion, an upper support member integrally formed with the upper end portion of the main plate no as to face away from the central axis and a lower support member integrally formed with the lower end portion of the main plate so as to face the central axis. The upper support ember of the plate segments of the one of the rings engages and is supported by the lower support member of the plate segments of another of the rings positioned above the one of the rings. The lower support member defines an open-bottom pocket having at least one pass-through opening for fluidly connecting a space inside the vortex finder with a space outside the vortex finder.

A second aspect the invention provides a plate segment of a vortex finder, comprising a non-flat main plate having an upper end portion, a lower end portion radially offset from the upper end portion and opposite radially inner and outer faces, an upper support member integrally formed with the upper end portion of the main plate so as to protrude from the outer face, and a lower support member integrally formed with the lower end portion of the main plate so as to protrude from the inner face. The lower support member defines an open-bottom pocket having at least one pass-through opening.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, wherein:

FIG. 8A is a front view of the plate segments of the vortex finder according to the exemplary embodiment of the present invention;

FIG. 8B is a side view of the plate segments of the vortex finder according to the exemplary embodiment of the present invention;

FIG. 8C is a rear view of the plate segments of the vortex finder according to the exemplary embodiment of the present invention;

FIG. 9 is a cross-sectional view of the plate segments of the vortex finder according to the exemplary embodiment of the present invention taken along the lines A-A in FIG. 8D;

FIG. 10 is a cross-sectional view of the plate segments of the vortex finder according to the exemplary embodiment of the present invention taken along the lines B-B in FIG. 8D;

FIG. 13 is a cross-sectional view of the plate segments of the vortex finder according to the exemplary embodiment of the present invention taken along the lines E-E in FIG. 12;

DESCRIPTION OF EXEMPLARY EMBODIMENTS

Figure 1:
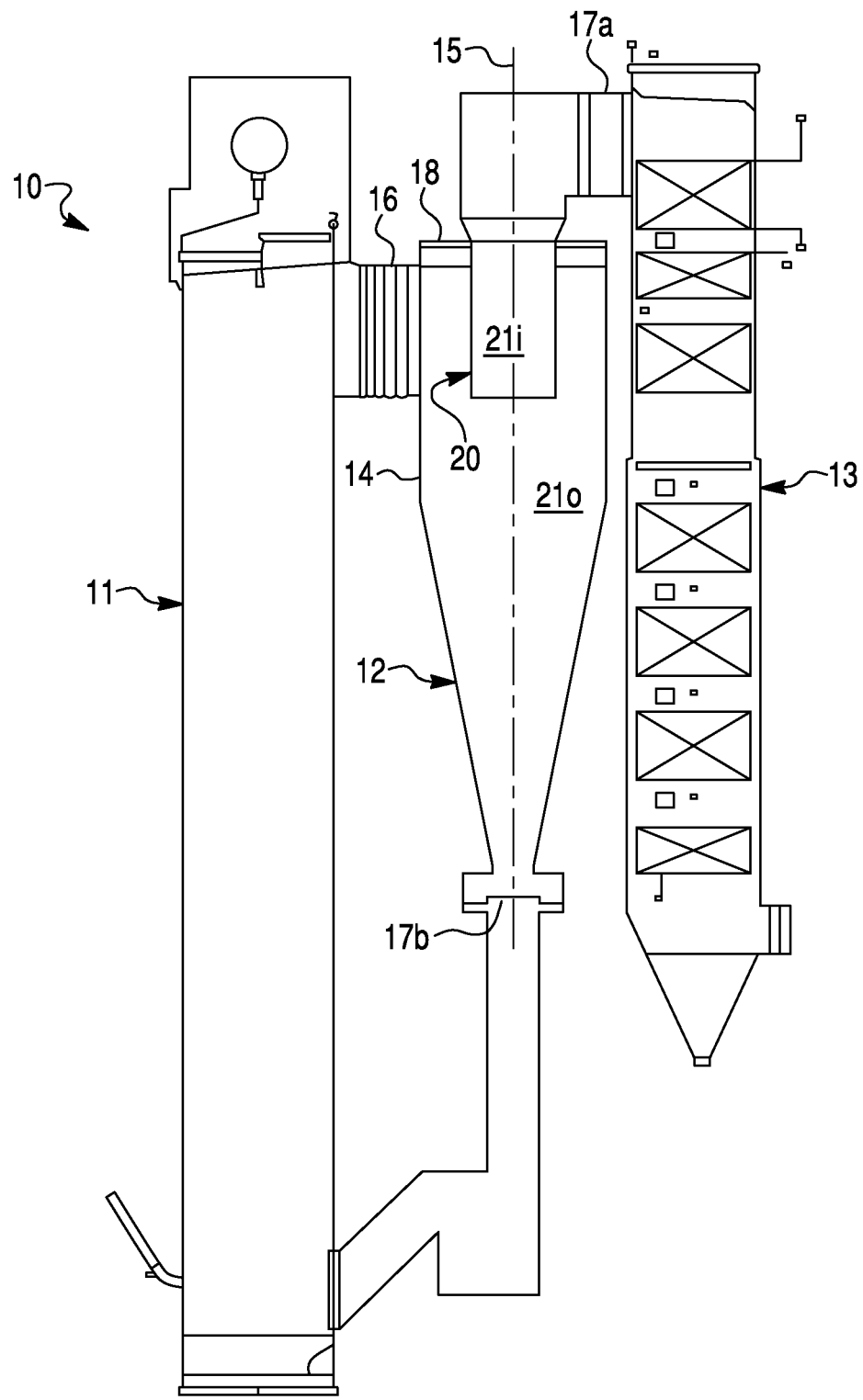
FIG. 1 is a schematic view of a steam generator of a fluidized bed combustor including a gas cyclone separator with a vortex finder according to the exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right" "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" as used in the claims means "at least one" and the word "two" as used in the claims means "at least two".

FIG. 1 schematically illustrates a steam generator of a fluidized bed combustor, such as a pressurized fluidized bed combustor (PFBC), atmospheric fluidized bed combustor (AFBC) or circulating fluidized bed combustor (CFBC), generally depicted with the reference numeral 10. The steam generator 10 includes a furnace 11, a hot gas cyclone separator 12 receiving combustion gas from the furnace 11, a parallel pass heat recovery area (HRA) 13 receiving gas from the cyclone separator 12.

The hot gas cyclone separator 12 comprises a housing 14 having a central axis 15, a gas inlet 16, a gas outlet 17a for withdrawal of lighter components of the combustion gas that flow upwardly, a particulate outlet 17b for withdrawal of heavier components of the combustion gas that have been separated in the cyclone separator 12, and a substantially cylindrical vortex finder 20 suspended from a support ring 18 at an upper end of the housing 14 of the cyclone separator 12 and extending into the housing 14 coaxially with the central axis 15 so as to be centrally-located in the housing 14 of the cyclone separator 12.

Figure 2:
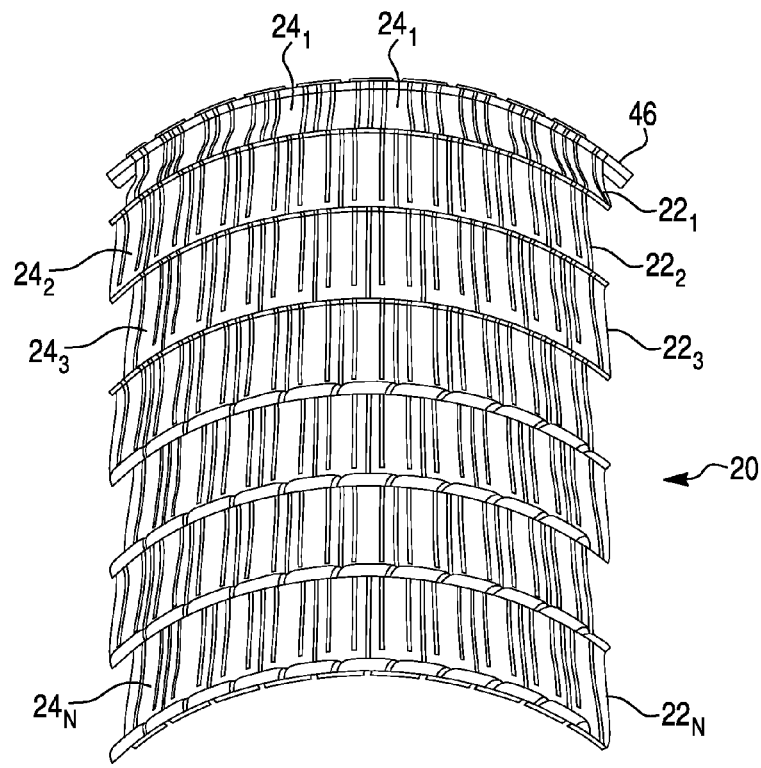
FIG. 2 is a partial perspective view of the vortex finder according to the exemplary embodiment of the present invention.
Figure 3:
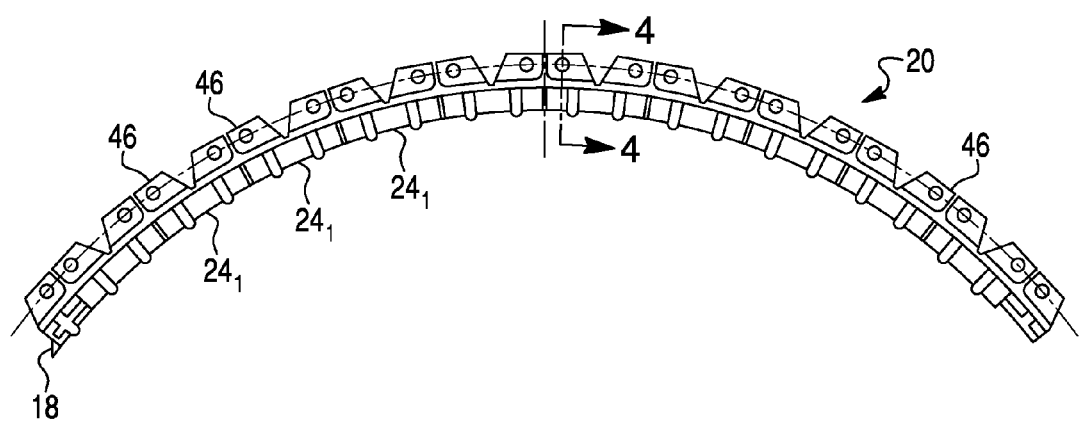
FIG. 3 is a partial top view of the vortex finder according to the exemplary embodiment of the present invention.
Figure 4:
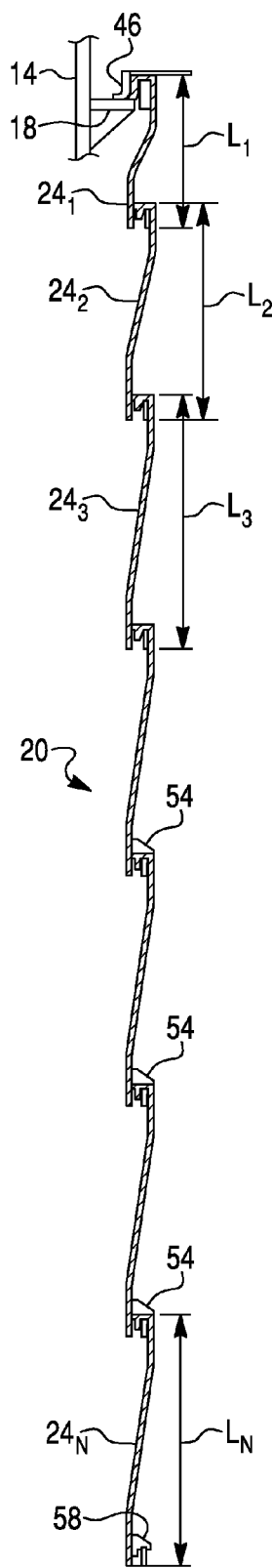
FIG. 4 is a cross-sectional view of the vortex finder according to the exemplary embodiment of the present invention taken along the lines 4-4 in FIG. 3.
Figure 7:
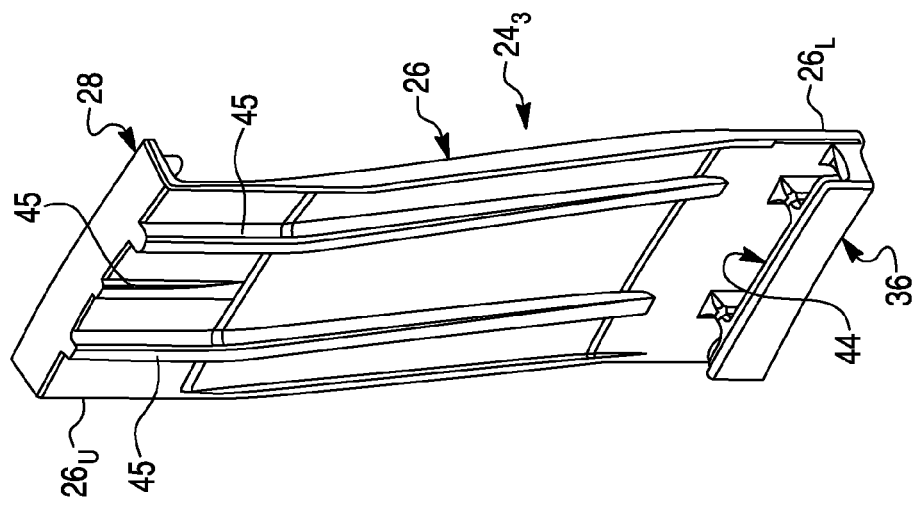
FIGS. 5-7 are perspective views of plate segments of the vortex finder according to the exemplary embodiment of the present invention.
Figure 6:
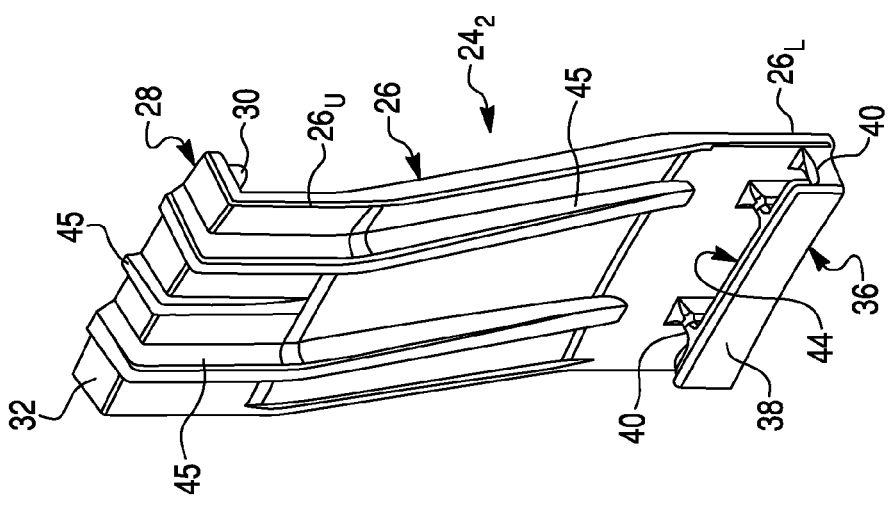
Figure 5:
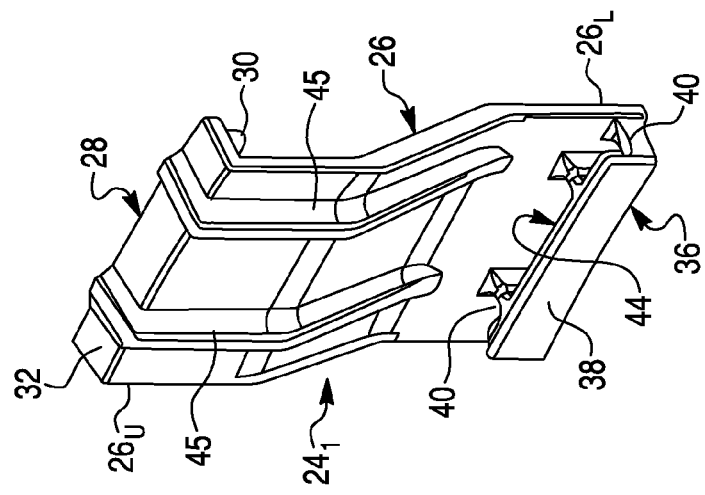

As illustrated in detail in FIGS. 2-4, the vortex finder 20 comprises a plurality of superposed, circumferentially extending rows $22_1$, $22_2$, ... $22_N$ of plate segments $24_1$, $24_2$, ... $24_N$ assembled so as to form the vortex finder 20 having the central axis 15. Each of the plurality of superposed, circumferentially extending rows $22_1$, $22_2$, ... $22_N$ of the plate segments $24_1, 24_2, \ldots 24_N$ forms a ring coaxial to the central axis 15. As further illustrated in FIGS. 2-4, the plate segments $24_1, 24_2, \ldots 24_N$ extend vertically and are circumferentially juxtaposed so as to form the substantially cylindrical vortex finder 20.

These plate segments $24_1, 24_2, \ldots 24_N$ are substantially structurally identical in the exemplary embodiment of the present invention, but may differ by size. In view of the structural similarities thereof, and in the interest of simplicity, the following discussion will sometimes use a reference numeral in brackets without a letter to designate an entire group of substantially identical structures. For example, the reference numeral [24] will be used when generically referring to the plate segments $24_1, 24_2, \ldots 24_N$ rather than reciting all reference numerals. Similarly, the reference numeral [22] will be used when generically referring to the rows (or rings) $22_1, 22_2, \ldots 22_N$ rather than reciting all reference numerals.

The plate segments [24] forming the same row (or ring) [22] (i.e., the plate segments [24] positioned at the same level) are substantially structurally and geometrically identical. However, the plate segments [24] forming different rows [22] are substantially structurally identical, while may differ by size. For instance, according to the exemplary embodiment of the present invention as illustrated in FIGS. 2, 4 and 5-7, the plate segments $24_1$ of the first row 22 are geometrically smaller than the plate segments $24_2$ of the second row $22_2$, which, in turn, are geometrically smaller than the plate segments $24_3$ of the third row $22_3$. Specifically, the height $L_1$ of the plate segments $24_1$ is smaller than the height $L_2$ of the plate segments $24_2$, while the height $L_3$ of the plate segments $24_3$ is greater than the height $L_2$, of the plate segments $24_2$, as best shown in FIG. 4.

The plate segments $24_1$ of the first row $22_1$ of the vortex tinder 20 are suspended from the support ring 18 of the housing 14 of the cyclone separator 12. The rest of the plate segments [24] of one of the rings [22] are suspended under the force of gravity from the plate segments of another of the rings positioned above the one of the rings for connecting the plate segments of each the ring to one another, as best shown in FIGS. 2-4. For that reason, the upper rows [22] of the vortex finder 20 are heavier and stronger than the adjacent lower rows [22] since the stress in the plate segments [24] is created by the weight of the lower rows [22]. Accordingly, the weight of lower rows [22] is lower than the supporting rows [22] above. The height [L] of the plate segments [24] does not control the weight thereof. In other words, the supporting ring of segments is equal to or heavier than the tower supporting ring of segments.

The plate segments [24] of one of the rings [22] are under the force of gravity from the plate segments [24] of another of the rings [22] positioned above the one of the rings [22] for connecting the plate segments [24] of each the ring [22] to one another, except of the plate segments $24_1$ of the first row $22_1$ of the vortex finder 20, which are suspended from the top end 18 of the housing 14 of the cyclone separator 12, as best shown in FIGS. 2-4. In other words, the plate segments 247 of the ring $22_2$ are suspended under the force of gravity from the plate segments $24_1$ of the ring $22_1$ positioned above the ring $22_2$ for connecting the plate segments $24_1$ and $24_2$ of the ring $22_1$ and $22_2$ to one another, while the plate segments $24_3$ of the ring $22_3$ are suspended under the force of gravity from the plate segments $24_2$ of the ring $22_2$ positioned above the ring $22_3$ for connecting the plate segments $24_2$ and $24_3$ of the ring $22_2$ and $22_3$ to one another, and so on.

As illustrated in detail in FIGS. 5-14, each of the plate segments [24] comprises a non-flat main plate 26 having an upper end portion $26_U$, a lower end portion $26_L$ radially offset from the upper end portion $26_U$, and a central portion $26_C$ interconnecting the upper end portion $26_U$ with the lower end portion $26_L$ of the main plate 26. According to the exemplary embodiment of the present invention illustrated in detail in FIGS. 4-7, 8B, 9, 10 and 13, the upper end portion $26_U$ and the lower end portion $26_L$ of the main plate 26 extend substantially parallel to the central axis 15, while the central portion $26_C$ is oriented obliquely relative to both the upper and lower end portions $26_U$ and $26_L$ of the main plate 26 so as to provide a radial offset "K" between the lower end portion $26_L$ and the upper end portion $26_U$ of the main plate 26. Furthermore, the main plate 26 has opposite radially inner and outer faces $27i$ and $27o$, respectively. Specifically, the inner face $27i$ faces the central axis 15, while the outer face $27o$ faces away from the central axis 15 of the vortex finder 20. Moreover, each of the plate segments [24] comprises an upper support member 28 integrally formed with the upper end portion $26_U$ of the main plate 26 so as to protrude from the outer face $27o$ of the main plate 26 and face away from the central axis 15, and a lower support member 36 integrally formed with the lower end portion $26_L$ of the main plate 26 so as to protrude from the inner face $27i$ of the main plate 26 and face the central axis 15 of the vortex finder 20.

As further illustrated in detail in FIGS. 2, 3, 8D, 8E, 11 and 12, the plate segment [24] is curved inwardly in the plane orthogonal to the central axis 15 and extends vertically in the direction substantially parallel to the central axis 15 to form the substantially cylindrical vortex finder 20.

The upper support member 28 includes a downwardly protruding upper flange 30 radially spaced from the radially outer face $27o$ of the main plate 26 and an upper connecting portion 32 integrally connecting the upper flange 30 to the upper end portion $26_U$ of the main plate 26 of the plate segments [24]. As illustrated, the upper connecting portion 32 extends radially outwardly from the upper end portion $26_U$ (or, the radially outer face $27o$) of the main plate 26 away from the central axis 15 in the direction substantially perpendicular to the central axis 15, while the upper flange 30 is spaced from the outer face $27o$ of the main plate 26 in the direction substantially perpendicular to the central axis 15.

In turn, the lower support member 36 includes an upwardly protruding lower flange 38 radially spaced from the inner face $27i$ of the main plate 26 and a lower connecting portion 40 integrally connecting the lower flange 38 to the lower end portion $26_L$ of the main plate 26 so as to form at least one pass-through opening 42 between the lower flange 38 of the lower support member 36 and the inner face $27i$ of the main plate 26 for fluidly connecting a space $21i$ inside the vortex finder 20 with a space $21o$ outside the vortex tinder 20 so as to form an open-bottom pocket 44 at the lower end portion $26_L$ of the main plate 26 of the plate segments [24]. The at least one pass-through opening 42 allows the ash, separated from the combustion gas, to flow and escape the vortex finder 20. As illustrated, the lower connecting portion 40 extends radially upwardly from the lower end portion $26_L$ (or, the radially inner face $27i$) of the main plate 26 toward the central axis 15 in the direction substantially perpendicular to the central axis 15, while the tower flange 38 is spaced from the inner face $27i$ of the main plate 26 in the direction substantially perpendicular to the central axis 15.

Figure 11:
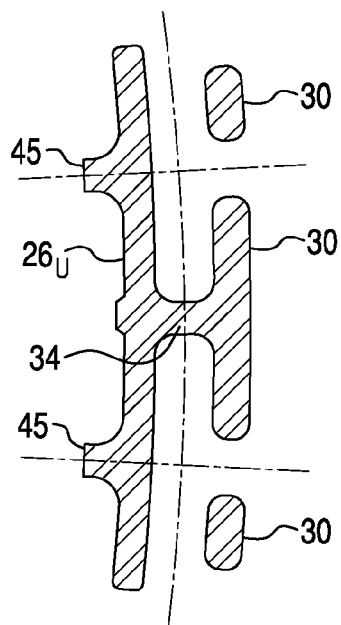
FIG. 11 is a cross-sectional view of the plate segments of the vortex finder according to the exemplary embodiment of the present invention taken along the lines C-C in FIG. 8B.

The upper flange 30 may be in the form of one or more upper flanges 30. According to the exemplary embodiment of the present invention as shown in FIGS. 8C and 11, the downwardly protruding upper flange 30 includes three upper flanges (or teeth) 30, each downwardly protruding from the upper connecting portion 32 and radially spaced from the radially outer face $27o$ of the main plate 26. As illustrated, the upper flanges 30 are geometrically different. Further according to the exemplary embodiment of the present invention, the centrally disposed upper flange 30 is provided with a strengthening rib 34 disposed between the central upper flange 30 and the upper end portion $26_U$ (or, the radially outer face 27o) of the main plate 26 below the upper connecting portion 32, as illustrated in FIGS. 8B, 8C, 9, 10 and 11.

Figure 8D:
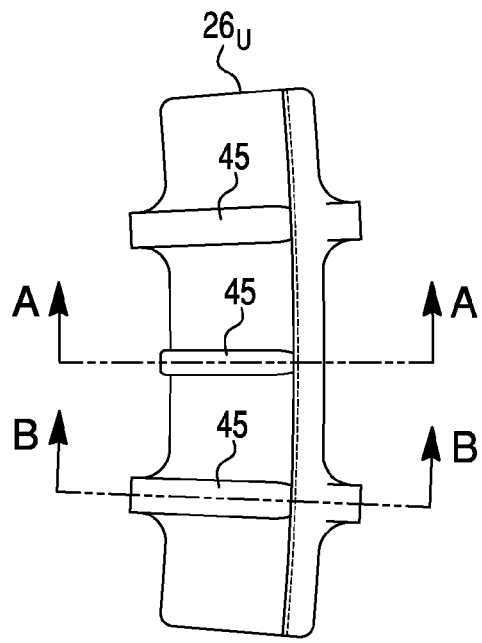
FIG. 8D is a top view of the plate segments of the vortex finder according to the exemplary embodiment of the present invention.
Figure 8E:
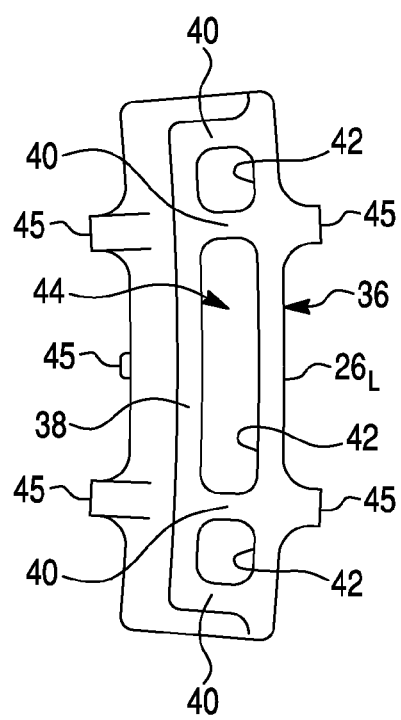
FIG. 8E is a bottom view of the plate segments of the vortex finder according to the exemplary embodiment of the present invention.
Figure 12:
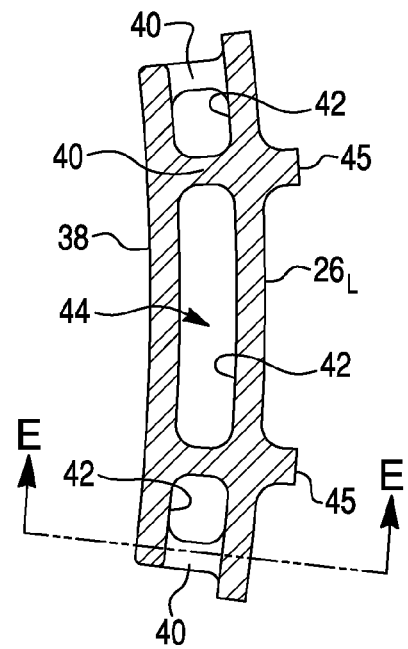
FIG. 12 is a cross-sectional view of the plate segments of the vortex finder according to the exemplary embodiment of the present invention taken along the lines D-D in FIG. 8B.
Figure 14:
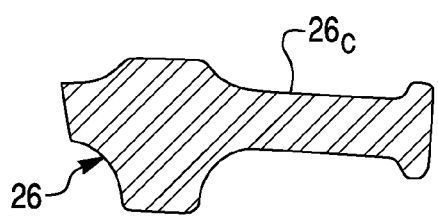
FIG. 14 is a cross-sectional view of the plate segments of the vortex finder according to the exemplary embodiment of the present invention taken along the lines F-F in FIG. 8B.

As described above, each of the plate segments [24] is provided with at least one (i.e., one or more) pass-through opening 42 between the lower flange 38 of the lower support member 36 and the inner face 27i of the main plate 26. The lower connecting portion 40 includes one or more connecting portions 40. According to the exemplary embodiment of the present invention as shown in FIGS. 8E and 12, the lower connecting portion 40 includes four lower connecting portions 40, each connecting the lower flange 38 to the lower end portion $26_L$ of the main plate 26. Further according to the exemplary embodiment of the present invention, the open spaces between the tower connecting portions 40 define three pass-through openings 42 of different area so as to form the open-bottom pocket 44. In other words, the open-bottom pocket 44 according to the exemplary embodiment of the present invention includes three pass-through openings 42, as best illustrated in FIGS. 8E and 12.

The lower end portion $26_L$ of the main plate 26 is radially offset from the upper end portion $26_U$ thereof so that the upper flange 30 of the upper support member 28 is aligned with a space between the lower flange 38 of the lower support member 36 and the lower end portion $26_L$ of main plate 26. In other words, the upper flange 30 is aligned with the open-bottom pocket 44 at the lower end portion $26_L$ of main plate 26, as shown in FIG. 13. Moreover, as illustrated in FIGS. 11 and 12, in the plate segments [24] according to the exemplary embodiment of the present invention, each of the three upper flanges 30 is aligned with the corresponding one of the three pass-through openings 42. As further illustrated in FIGS. 11 and 12, geometrical dimensions (length, width, area) of the three upper flanges 30 are smaller than geometrical dimensions (length, width, area) of the three corresponding pass-through openings 42. The plate segments [24] provided with the open-bottom pocket 44, which allows the ash, separated from the combustion gas, to flow and escape the vortex finder 20 through the at least one pass-through opening 42, expand and contract more freely, thus reducing stresses and therefore, the tendency to warp.

According to the exemplary embodiment of the present invention shown in FIGS. 5-8E, 11 and 12, each of the plate segments [24] of the vortex finder 20 is provided with at least two reinforcing ribs 45 formed unitarily with the main plate 26 both on the outer and inner faces 27o, 27i of the main plate 26. In addition, as shown best in FIGS. 5, 6 and 8A-8D, the reinforcing ribs 45 may be formed on an outer surface of the upper connecting portion 32 of the upper support member 28. In other words, according to the exemplary embodiment of the present invention, the reinforcing ribs 45 extend the entire length of the central portion $26_C$ and at least part of the upper and lower end portions $26_U$ and $26_L$ of the main plate 26. Also, the reinforcing ribs 45 may extend across the outer surface of the upper connecting portion 32 of the upper support member 28. The reinforcing ribs 45 are provided to reduce the overall volume and therefore weight of the plate segment [24] resulting in a stronger segment, which is under less stress due to the reduced weight of the adjacent plate segments [24] and overall reduced weight of the fully assembled vortex finder 20.

Further according to the exemplary embodiment of the present invention, each of the plate segments [24] of the vortex finder 20 is a unitary cast steel part providing a high heat resistance. However, the plate segment [24] of the vortex finder 20 made of metallic, ceramic, or any other appropriate material is also within the scope of the present invention. Further according to the exemplary embodiment of the present invention, the steel plate segments [24] may be coated with ceramic material. The use of ceramic coatings of the steel plate segments [24] provided improved temperature control, heat resistance, friction reduction, and erosion protection of the vortex finder 20. Moreover, the ceramic coating functions as means of wear protection and friction reduction. As a result, hot combustion gas from the circulating fluidized bed combustor and particulates easily travel at a higher velocity with less turbulence due to smoother surface inside the vortex finder 20. The ceramic coating reduces heat toss, thus increasing performance of the fluidized bed combustor. The ceramic coating of the steel plate segments [24] also assists in shedding performance reducing particulate accumulation on and within the plate segments [24] as it makes more difficult for the ash to adhere to the plate segments [24].

Therefore, primary benefits of using ceramic coating on the plate segments [24] are:
 ceramic coating when applied to metal surfaces of the plate segments [24] protects against erosion, corrosion, and extends life of the plate segments [24];
 as a thermal barrier, ceramic coating enhances performance and reduces critical temperature of the plate segments [24];
 ceramic coating is not prone to chip, crack, or peel, and permits better survival to stress and thermal shock of the plate segments [24];
 ceramic coating can survive base metal temperatures above typical CFB operating temperature; and
 ceramic coating is easily cleaned.

Figure 15:
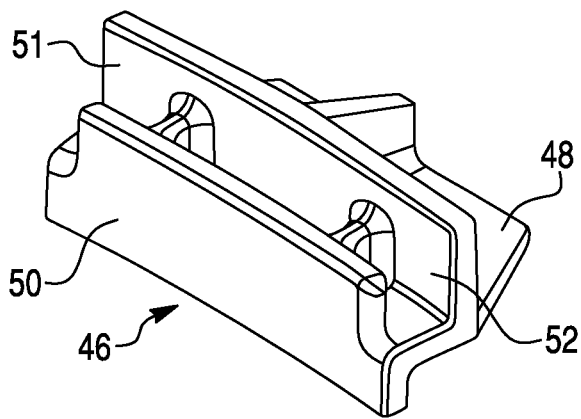
FIG. 15 is a perspective view of a support member in the gas cyclone separator for supporting the vortex finder according to the exemplary embodiment of the present invention.
Figure 16:
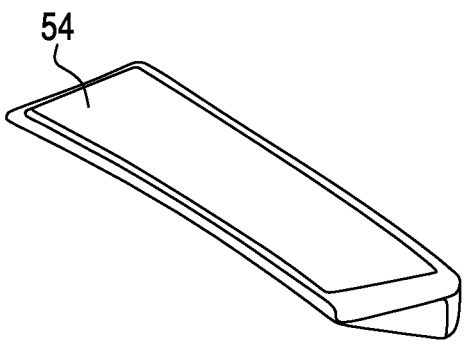
FIG. 16 is a perspective view of a stiffner for the vortex finder according to the exemplary embodiment of the present invention.
Figure 17:
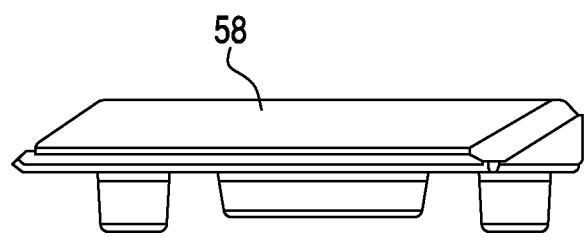
FIG. 17 is a perspective view of a clamp for the vortex finder according to the exemplary embodiment of the present invention.

As disclosed above, the plate segments $24_1$ of the first row $22_1$ of the vortex finder 20 are suspended from the supporting member 18 of the housing 14 of the cyclone separator 12. Specifically, according to the exemplary embodiment of the present invention as illustrated in FIGS. 3 and 4, the support ring 18 is provided with a plurality of curved support members 46 attached (such as by welding or fastening with bolts) to the support ring 18 for supporting the plate segments $24_1$ of the first row $22_1$ of the vortex finder 20. As illustrated in detail FIG. 15, each of the support embers 46 comprises a substantially horizontal support plate 48 attached to the support ring 18 (such as by welding or fasteners), and substantially parallel support flanges 50 and 51 extending upwardly from and formed unitary with the support plate 48 so as to form a support channel 52. The support channel 52 is provided for receiving the upper flange 30 of the plate segments $24_1$ of the first row $22_1$ of the vortex finder 20 when the vortex finder 20 is suspended from the support ring 18. Moreover, the vortex finder 20 may also include a plurality of stiffeners 54, shown in FIGS. 4 and 16, mounted on top of the upper connecting portions 32 of the upper support members 28 of at least some of the plate segments [24]. Furthermore, the lower rings (e.g., the ring $22_N$) of the vortex finder 20 may also include a plurality of clamps 58 engaging the adjacent plate segments (such as plate segments $24_N$) of the same ring (as shown in FIG. 17) in order to avoid flapping of the lower plate segments 24.

Therefore, the present invention provides novel plate segments of a vortex finder for a cyclone separator, provided with at least one pass-through opening in a lower support member thereof for fluidly connecting a space inside the vortex finder with a space outside the vortex finder. The plate segments for the vortex tinder according to the present invention reduce the possibility of deformation or braking, are stronger yet have lower weight, and provide reduced stresses at peak stress points and reduced heat loss.

The foregoing description of the exemplary embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A vortex finder for a cyclone separator, said vortex finder being suspended from a top end of said cyclone separator, said vortex finder comprising:
   a central axis; and
   a plurality of superposed, circumferentially extending rings coaxial to said central axis and assembled so as to form said vortex finder;
   each of said rings comprising a plurality of substantially identical plate segments positioned at the same level so as to form said ring;
   said plate segments of one of said rings being suspended under the force of gravity from said plate segments of another of said rings positioned above said one of said rings for connecting said plate segments of each said ring to one another;
   each of said plate segments including a non-flat main plate having an upper end portion and a lower end portion radially offset from said upper end portion, an upper support member integrally formed with said upper end portion of said main plate so as to face away from said central axis and a lower support member integrally formed with said lower end portion of said main plate so as to face said central axis, wherein said main plate further comprises a central portion, said upper end portion and said lower end portion extend substantially parallel to said central axis and said central portion is oriented obliquely relative to said upper end portion and said lower end portion to provide said offset;
   said upper support member of said plate segments of said one of said rings engaging and supported by said lower support member of said plate segments of said another of said rings positioned above said one of said rings;
   said lower support member defining an open-bottom pocket having at least one pass-through opening for fluidly connecting a space inside said vortex finder with a space outside said vortex finder.

2. The vortex finder as defined in claim 1, wherein said main plate is radially bent in a plane orthogonal to said central axis.

3. The vortex finder as defined in claim 1, wherein said plate segments of one said rings have different size than said plate segments of another of said rings positioned adjacent to said one of said rings.

4. A vortex finder for a cyclone separator, said vortex finder being suspended from a top end of said cyclone separator, said vortex finder comprising:
   a central axis; and
   a plurality of superposed, circumferentially extending rings coaxial to said central axis and assembled so as to form said vortex finder;
   each of said rings comprising a plurality of substantially identical plate segments positioned at the same level so as to form said ring;
   said plate segments of one of said rings being suspended under the force of gravity from said plate segments of another of said rings positioned above said one of said rings for connecting said plate segments of each said ring to one another;
   each of said plate segments including a non-flat main plate having an upper end portion and a lower end portion radially offset from said upper end portion, an upper support member integrally formed with said upper end portion of said main plate so as to face away from said central axis and a lower support member integrally formed with said lower end portion of said main plate so as to face said central axis,
   wherein a height of said plate segments of one said rings is equal or greater than the height of said plate segments of another of said rings positioned above said one of said rings.

5. The vortex finder as defined in claim 1, wherein said upper support member having a downwardly protruding upper flange radially spaced from a radially outer face of said main plate and an upper connecting portion integrally connecting said upper flange to said upper end portion of said main plate; and wherein said lower support member having an upwardly protruding lower flange radially spaced from a radially inner face of said main plate and a lower connecting portion integrally connecting said lower flange to said lower end portion of said main plate so as to form said at least one pass-through opening between said lower flange of said lower support member and said inner face of said main plate and defining an open-bottom pocket at said lower end portion of said main plate of said plate segments.

6. The vortex finder as defined in claim 5, wherein said lower end portion of said main plate is radially offset from said upper end portion thereof so that said upper flange of said upper support member is aligned with a space between said lower flange of said lower support member and said lower end portion of said main plate.

7. The vortex finder as defined in claim 5, wherein said lower end portion of said main plate of said plate segments of one said rings is radially offset from said upper end portion thereof so that said upper flange of said upper support member of said plate segments of one of said rings is disposed in a space between said lower flange of said lower support member and said lower end portion of said main plate of said plate segments of another of said rings positioned above said one of said rings.

8. The vortex finder as defined in claim 5, wherein a cross section of said upper flange is smaller than an area of said at least one pass-through opening.

9. The vortex finder as defined in claim 5, wherein said upper flange of said upper support member of said plate segment of said one of said rings is disposed in said open-bottom pocket of said plate segment of said another of said rings positioned above said one of said rings.

10. The vortex finder as defined in claim 1, wherein each of said plate segments is a unitary metal part.

11. The vortex finder as defined in claim 10, wherein each of said unitary metal part is coated with ceramic material.

12. A plate segment of a vortex finder, said plate segment comprising:
  a non-flat main plate having an upper end portion, a lower end portion radially offset from said upper end portion, a central portion disposed between said upper end portion and said lower end portion, and opposite radially inner and outer faces, wherein said upper end portion and said lower end portion extend substantially parallel the said central axis and said central portion is oriented obliquely relative to said upper end portion and said lower end portion to provide said offset;
  an upper support member integrally formed with said upper end portion of said main plate so as to protrude from said outer face; and
  a lower support member integrally formed with said lower end portion of said main plate so as to protrude from said inner face;
  said lower support member defining an open-bottom pocket having at least one pass-through opening.

13. The plate segment as defined in claim 12, wherein said upper support member having a downwardly protruding upper flange radially spaced from said outer face of said main plate and an upper connecting portion integrally connecting said upper flange to said upper end portion of said main plate; and wherein said lower support member having an upwardly protruding lower flange radially spaced from said inner face of said main plate and a lower connecting portion integrally connecting said lower flange to said lower end portion of said main plate so as to form said at least one pass-through opening between said lower flange of said lower support member and said inner face of said main plate.

14. The plate segment as defined in claim 13, wherein said lower end portion of said main plate is radially offset from said upper end portion thereof so that said upper flange of said upper support member is aligned with a space between said lower flange of said lower support member and said lower end portion of said main plate.

15. The plate segment as defined in claim 13, wherein a cross section of said upper flange is smaller than an area of said at least one pass-through opening.

16. The plate segment as defined in claim 13, wherein said upper flange of said upper support member is aligned with said at least one pass-through opening in said lower support member.

17. The vortex finder as defined in claim 13, wherein each of said plate segments is a unitary metal part.

18. The vortex finder as defined in claim 17, wherein each of said unitary metal part is coated with ceramic material.

19. The plate segment as defined in claim 13, wherein said plate segment is provided with at least two reinforcing ribs formed unitarily with said main plate both on said outer and inner faces of said main plate.

20. The plate segment as defined in claim 19, wherein said plate segment is provided with three reinforcing ribs formed unitarily with said main plate on said inner face of said main plate.

21. The plate segment as defined in claim 19, wherein said plate segment is provided with at least two reinforcing ribs formed on said upper connecting portion of said upper support member.

22. The vortex finder as defined in claim 13, wherein each of said plate segments has four lower connecting portions integrally connecting said lower flange to said lower end portion of said main plate forming three pass-through opening between said lower connecting portions, said lower flange of said lower support member and said inner face of said main plate.

* * * * *